(12) United States Patent
Freeman (10) Patent No.: US 10,847,977 B2
(45) Date of Patent: Nov. 24, 2020

(54) REGULATING THE OPERATING POINT OF A POWER INVERTER

(71) Applicant: Nexus Technologies, Inc., Fletcher, NC (US)

(72) Inventor: Belvin Freeman, Asheville, NC (US)

(73) Assignee: Nexus Technologies, Inc., Fletcher, NC (US)

( * ) Notice: Subject to any disclaimer, the term of this patent is extended or adjusted under 35 U.S.C. 154(b) by 65 days.

(21) Appl. No.: 16/359,458

(22) Filed: Mar. 20, 2019

(65) Prior Publication Data

US 2019/0296557 A1    Sep. 26, 2019

Related U.S. Application Data

(60) Provisional application No. 62/645,532, filed on Mar. 20, 2018.

(51) Int. Cl.
*H02J 3/46* (2006.01)
*H02M 7/493* (2007.01)
(Continued)

(52) U.S. Cl.
CPC ........ *H02J 3/46* (2013.01); *H02J 3/42* (2013.01); *H02M 7/493* (2013.01); *H02J 3/003* (2020.01)

(58) Field of Classification Search
CPC .... H02J 3/46; H02J 3/42; H02J 3/003; H02M 7/493
See application file for complete search history.

(56) References Cited

U.S. PATENT DOCUMENTS 7,567,064 B2    7/2009  Ponnaluri et al.
7,830,037 B2 *  11/2010 Hirst .................. H02J 3/14
                                              307/39
(Continued)

FOREIGN PATENT DOCUMENTS

CN      104167764 A    11/2014
CN      104201718 A    12/2014
(Continued)

OTHER PUBLICATIONS

J. Guerrero et al., "Decentralized Control for Parallel Operation of Distributed Generation Inverters Using Resistive Output Impedance", IEE Transactions on Industrial Electronics, vol. 54., No. 2, pp. 994-1004; Apr. 2007.

(Continued)

*Primary Examiner* — Thomas J. Hiltunen
(74) *Attorney, Agent, or Firm* — Womble Bond Dickinson (US) LLP (57) ABSTRACT

A method is provided for power limiting in a power inverter configured to produce an output voltage and having a voltage regulator with a voltage setpoint defined for no load on an external bus line. The method includes determining a power level related to a load on the external bus line, determining an adjusted voltage setpoint based on the power level, including: decreasing the voltage setpoint to the adjusted voltage setpoint having a first value when the power level is above a maximum threshold, increasing the voltage setpoint to the adjusted voltage setpoint having a second value when the power level is below a minimum threshold, and slewing the adjusted voltage setpoint to the voltage setpoint so that the adjusted voltage setpoint has a third value when the power level is within a range defined by the maximum threshold and the minimum threshold.

20 Claims, 9 Drawing Sheets

(51) Int. Cl.
*H02J 3/42* (2006.01)
*H02J 3/00* (2006.01)

(56) References Cited

U.S. PATENT DOCUMENTS

| | | | |
|---|---|---|---|
| 7,888,919 B2 * | 2/2011 | Dishman | H02M 3/156 |
| | | | 323/266 |
| 9,240,706 B2 | 1/2016 | Patel et al. | |
| 9,337,747 B2 | 5/2016 | Sakamoto et al. | |
| 9,466,984 B2 | 10/2016 | Cardinal et al. | |
| 9,564,772 B2 * | 2/2017 | Qiu | H02J 7/02 |
| 9,614,506 B1 * | 4/2017 | DiRenzo | H03K 5/12 |
| 9,634,075 B2 | 4/2017 | Chung et al. | |
| 9,742,260 B2 | 8/2017 | Della Flora | |
| 9,800,051 B2 * | 10/2017 | Laubenstein | H02M 7/06 |
| 9,979,196 B2 * | 5/2018 | Alfermann | H02J 1/10 |
| 10,401,885 B2 * | 9/2019 | Bollman | H02M 3/07 |
| 10,536,004 B2 * | 1/2020 | Lewis | H02J 4/00 |
| 10,601,226 B2 * | 3/2020 | Gurunathan | H01M 8/04604 |
| 2014/0203649 A1 | 7/2014 | Cheek et al. | |
| 2016/0268807 A1 | 9/2016 | Jackson et al. | |
| 2019/0267806 A1 * | 8/2019 | Scott | H02J 3/50 |

FOREIGN PATENT DOCUMENTS

| | | |
|---|---|---|
| CN | 104539186 A | 4/2015 |
| CN | 104601029 A | 10/2016 |
| CN | 103904929 A | 11/2016 |
| GB | 2546804 A | 8/2017 |

OTHER PUBLICATIONS

T. Kawabata et al., "Parallel Operation of Voltage Source Inverters", Power Electronics Dept. Mitsubishi Electric Co., 1986; pp. 309-320.
International Search Report and Written Opinion dated Jun. 4, 2019; Application No. PCT/IB2019/052275.

* cited by examiner

REGULATING THE OPERATING POINT OF A POWER INVERTER

CROSS-REFERENCE TO RELATED APPLICATIONS

This application claims the benefit of U.S. Provisional Patent Application Ser. No. 62/645,532, filed 20 Mar. 2018, the contents of which are hereby incorporated by reference.

TECHNOLOGICAL FIELD

The present disclosure relates generally to power flow control, and in particular, to regulating the operating point of a power inverter.

BACKGROUND

A classical technique used in the power industry for sharing a load across multiple power sources (e.g., power inverters) is to utilize a droop algorithm. A classical droop algorithm used in stand-alone inverters may implement an equation such as:

$$V = V_0 - n \times P_{avg} - R_d \times I \tag{1}$$

This equation may be applied to instantaneous signals but using a time-average power measurement (e.g., a low pass filter on instantaneous power). When $$I = \frac{P_{avg}}{2V_0},$$

substituting I may yield an effective power droop slope of $$n_{eff} = n + 0.5 \times \frac{R_d}{V_0} = 0.0021 \tag{2}$$

In a parallel power system, if all sources use the same droop law and measure voltage at a common bus, then they should solve the same droop equation and therefore output the same power in steady state. A need exists to provide a power inverter with power limiting capabilities in addition to a droop algorithm.

BRIEF SUMMARY

Example implementations of the present disclosure are directed regulating the operating point of a power inverter. The present disclosure includes, without limitation, the following example implementations.

Some example implementations provide a method for power limiting in a power inverter connected to an external bus line, the power inverter configured to produce an output voltage and having a voltage regulator with a voltage setpoint defined for no load on the external bus line, the method comprising: determining a power level related to a load on the external bus line; determining an adjusted voltage setpoint based on the power level, including: decreasing the voltage setpoint to the adjusted voltage setpoint having a first value when the power level is above a maximum threshold; increasing the voltage setpoint to the adjusted voltage setpoint having a second value when the power level is below a minimum threshold; and slewing the adjusted voltage setpoint to the voltage setpoint so that the adjusted voltage setpoint has a third value when the power level is within a range defined by the maximum threshold and the minimum threshold; and causing the voltage regulator to regulate the output voltage based on the adjusted voltage setpoint.

In some example implementations of the method of any preceding example implementation, or any combination of any preceding example implementations, the first value is no less than 20% of the voltage setpoint.

In some example implementations of the method of any preceding example implementation, or any combination of any preceding example implementations, the second value is no greater than 120% of the voltage setpoint.

In some example implementations of the method of any preceding example implementation, or any combination of any preceding example implementations, the third value is no less than 20% of the voltage setpoint and no greater than 120% of the voltage setpoint.

In some example implementations of the method of any preceding example implementation, or any combination of any preceding example implementations, the power level and thereby the adjusted voltage setpoint are time-variable, and the slewing the adjusted voltage setpoint causes the third value of the adjusted voltage setpoint to approach the voltage setpoint over time.

In some example implementations of the method of any preceding example implementation, or any combination of any preceding example implementations, the method further comprises: slewing a second adjusted voltage setpoint to the adjusted voltage setpoint, wherein the voltage regulator is caused to regulate the output voltage based on the second adjusted voltage setpoint, and thereby based on the adjusted voltage setpoint.

In some example implementations of the method of any preceding example implementation, or any combination of any preceding example implementations, the method further comprises: reducing the adjusted voltage setpoint proportional to the load on the external bus line, and thereby to a reduced adjusted voltage setpoint, wherein the voltage regulator is caused to regulate the output voltage based on the reduced adjusted voltage setpoint, and thereby based on the adjusted voltage setpoint.

In some example implementations of the method of any preceding example implementation, or any combination of any preceding example implementations, the method further comprises: slewing a second adjusted voltage setpoint to the adjusted voltage setpoint, wherein the second adjusted voltage setpoint is reduced proportional to the load on the external bus line, and thereby to the reduced adjusted voltage setpoint.

Some example implementations provide a power inverter connectable to an external bus line and configured to produce an output voltage, the power inverter comprising: a voltage regulator with a voltage setpoint defined for no load on the external bus line; and processing circuitry configured to at least perform the method of any preceding example implementation, or any combination of any preceding example implementations.

Some example implementations provide a computer-readable storage medium for power limiting in a power inverter connectable to an external bus line, the power inverter configured to produce an output voltage and having a voltage regulator with a voltage setpoint defined for no load on the external bus line, the computer-readable storage medium being non-transitory and having computer-readable program code stored therein that in response to execution by processing circuitry, cause the power inverter to at least perform the method of any preceding example implementation, or any combination of any preceding example implementations.

These and other features, aspects, and advantages of the present disclosure may be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It may therefore be appreciated that this Brief Summary is provided merely for purposes of summarizing some example implementations so as to provide a basic understanding of some aspects of the disclosure. Accordingly, it may be appreciated that the above described example implementations are merely examples and should not be construed to narrow the scope or spirit of the disclosure in any way. Other example implementations, aspects and advantages may become apparent from the following detailed description taken in conjunction with the accompanying figures illustrating, by way of example, the principles of some described example implementations.

BRIEF DESCRIPTION OF THE FIGURES

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and may fully convey the scope of the disclosure to those skilled in the art. For example, unless otherwise indicated, reference to something as being a first, second or the like should not be construed to imply a particular order. Also, while reference may be made herein to quantitative measures, values, geometric relationships or the like, unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to power flow control, and more particularly directed to regulating the operating point of a power inverter such that the power inverter remains online and operating acceptably regardless of load or combination of parallel-connected power sources.

This disclosure describes a voltage-power management algorithm implemented in an apparatus, a method, and a computer-readable storage medium configured to achieve individual inverter output power limiting, smooth synchronization with slew-rate-restricted transitions, and balanced power operation without the need for external communications. The output follows a classical droop profile modified to include low and high-side power flow limiting. The algorithm may work with any number of inverters operated together in parallel. Each inverter may be kept operating within its own limits (after slewing completes) regardless of what may be connected to the inverter.

This algorithm may also protect the inverter in the event of grid-parallel connection. Under such conditions, the inverter may adjust its voltage setpoint to limit the power at either the maximum export or import limits depending on the value of the grid voltage (below or above nominal voltage, respectively). Because the grid may be too large to be affected by the inverter, the grid voltage may not change, and the inverter operation may become self-protecting based on whichever power flow limit may be reached.

Extensions to the algorithm may be possible—the droop algorithm may include Q-ω (reactive power vs. frequency) control, non-resistive load support, and function in the presence of calibration errors. In some example implementations, the output power limit may be temperature-time dependent ($I^2t$ reference curve).

Initialization of a power inverter on an external bus line may involve a phase-locked loop (PLL) synchronization state machine. The loop may either match the fundamental amplitude, phase, and frequency of the voltage waveform at the external switch connecting point, or the loop filter may find inadequate voltage present and declare a dead-bus condition. At the time when the inverter joins a live-bus connection, the inverter may join the live bus in parallel operation with another inverter. The controlled inverter may be initialized using the PLL synchronization involving voltage analysis. The voltage analysis may have known distortions, e.g., the presence of a low-pass analog filter, the time delay between A/D measurement and PWM output register update, the LCL filter, and the half-period lag of the fundamental PWM output voltage in the "average switching model" of power systems analysis. Such distortions may be predictable from the known converter circuit model and may be compensated by adjusting the PLL measurement by gain and phase shift corrections. When the inverter turns on with a source voltage accurately matching the point of connection (i.e., synchronizing with another inverter on a live bus), there may initially be no current or power flow from the syncing inverter, which is the goal of the synchronization procedure.

In a power inverter, a droop algorithm may be implemented as a slow background process that describes the changing setpoint voltage used by a voltage regulator (which may be a high-speed voltage regulator). Giving the droop algorithm a different time constant from the voltage regulator prevents them from interacting—the two behaviors being effectively independent.

Figure 4:
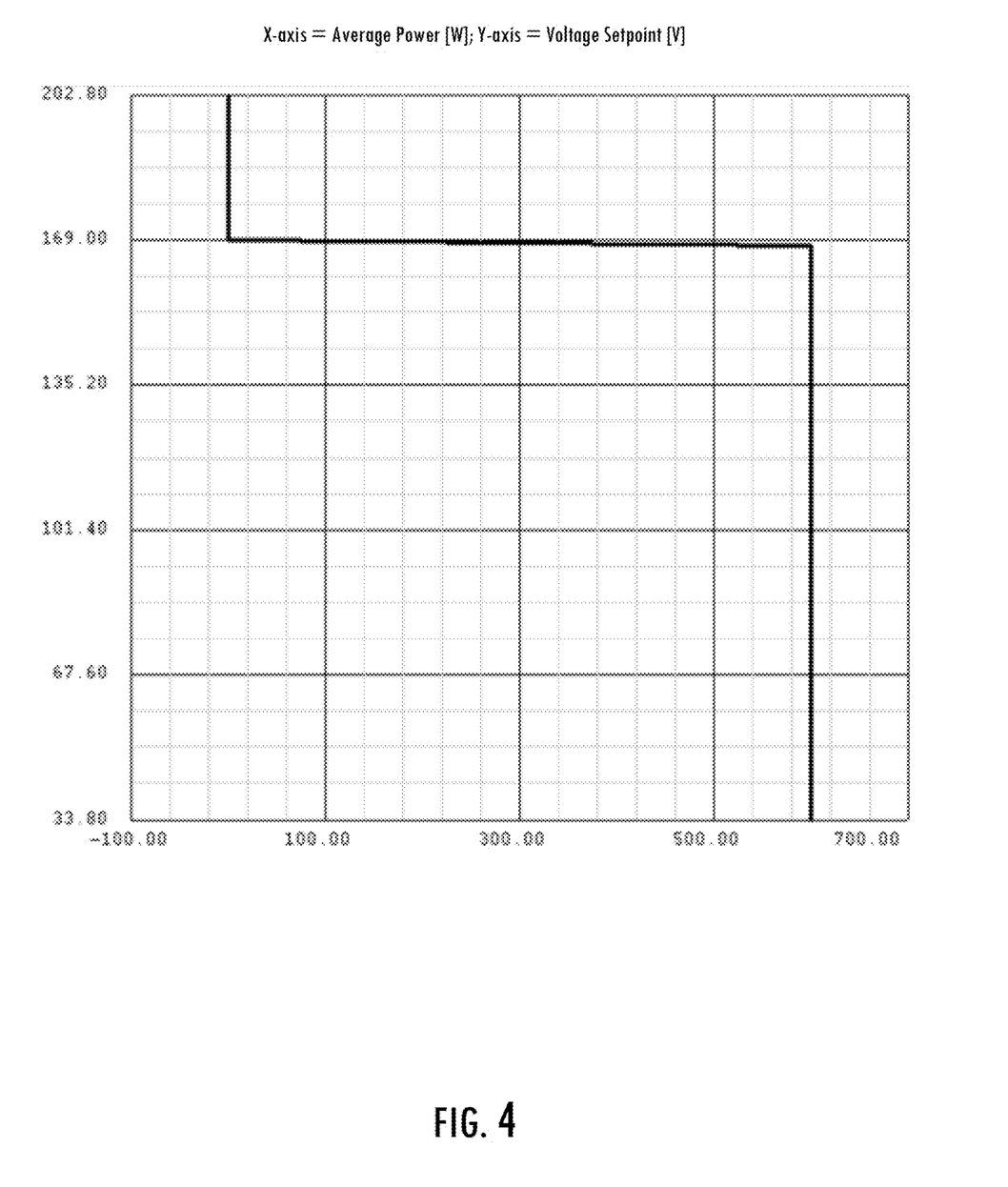
FIG. 4 shows a voltage-power (V-P) profile for a power inverter, according to example implementations.

The droop algorithm may reduce the voltage amplitude proportional to the output power. In the standard droop algorithm, no effort is made to constrain the output power within any limits. The present disclosure modifies the droop algorithm by combining the algorithm with power limiting features. As shown in FIG. 4, if the output power is within the capability limits [Pmin, Pmax], (which is shown as [0 W, 600 W] in the example plot of FIG. 4), the standard voltage reduction equation (the standard droop algorithm) is used. The calculated voltage amplitude may be close to nominal (shown as 169 V in this example), and that voltage may be used as the setpoint of the voltage regulator.

If the output power falls below the minimum threshold $P_{min}$, the voltage amplitude is raised (up to a maximum of $1.2V_0$) in an effort to raise the output, preventing backfeeding into the power inverter. If the output power exceeds the maximum threshold $P_{max}$, the voltage amplitude is reduced (down to a minimum of $0.2V_0$) in an effort to reduce the output, staying within the capabilities of the power inverter. FIG. 4 shows the resulting voltage-power (V-P) profile, according to example implementations. Power flow limiting may result in off-nominal voltage output from the inverter, but it may keep the inverter online and within design limits.

Changes in the power flow control of the inverter may be slew-rate limited. Slew-rate limiting may provide dampening for smoother voltage transitions, and by proper choice of gain constants, keeps the power flow control much slower than the voltage regulator control, thereby preventing undesired interaction.

Figure 1:
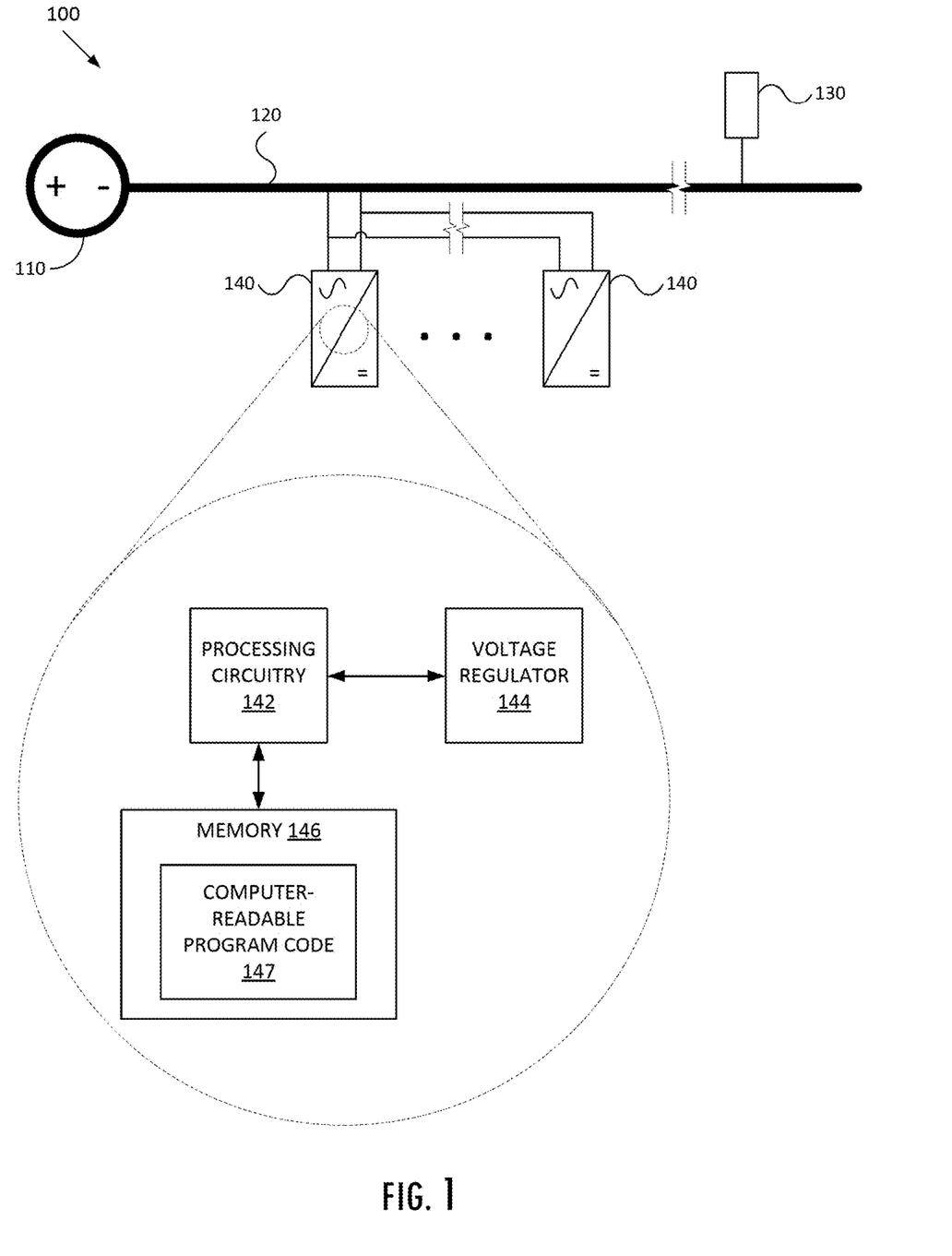
FIG. 1 illustrates one or more power inverters connected to an external bus line, according to example implementations.

FIG. 1 shows an example of an external bus line 120 to which a load 130 is connected as well as one or more power inverters 140 (or as shown a plurality of parallel-connected power inverters 140) and a voltage source 110. As also shown in FIG. 1, the power inverter 140 may include processing circuitry 142 and a voltage regulator 144, and in some examples, memory 146 storing computer-readable program code 147.

As shown in FIG. 1, the power inverter 140 may be connected or connectable to the external bus line 120 and configured to produce an output voltage $V_{out}$. The power inverter 140 may include the voltage regulator 144 with a voltage setpoint $V_0$ defined for no load on the external bus line 120. The power inverter 140 may include processing circuitry 142 configured to determine a power level P related to the load 130 on the external bus line 120. The processing circuitry 142 may also be configured to determine an adjusted voltage setpoint $V_1$ based on the power level P. In this regard, the processing circuitry 142 may be configured to decrease the voltage setpoint $V_0$ to the adjusted voltage setpoint $V_1$ having a first value when the power level P is above a maximum threshold $P_{max}$. The processing circuitry 142 may increase the voltage setpoint $V_0$ to the adjusted voltage setpoint $V_1$ having a second value when the power level P is below a minimum threshold $P_{min}$. And the processing circuitry 142 may slew the adjusted voltage setpoint $V_1$ to the voltage setpoint $V_0$ so that the adjusted voltage setpoint $V_1$ has a third value when the power level P is within a range defined by the maximum threshold and the minimum threshold ($P_{min} \leq P \leq P_{max}$). The processing circuitry 142 may then cause the voltage regulator 144 to regulate the output voltage $V_{out}$ based on the adjusted voltage setpoint $V_1$.

In some example implementations, the first value is no less than 20% of the voltage setpoint $V_0$. In some examples, the second value is no greater than 120% of the voltage setpoint $V_0$. In some examples, the third value is no less than 20% of the voltage setpoint and no greater than 120% of the voltage setpoint ($0.2V_0 \leq V_1 \leq 1.2V_0$). In some example implementations, the power level P and thereby the adjusted voltage setpoint $V_1$ are time-variable, and in some of these examples, the slewing the adjusted voltage setpoint $V_1$ causes the third value of the adjusted voltage setpoint $V_1$ to approach the voltage setpoint $V_0$ over time.

In some example implementations, the processing circuitry 142 may be further configured to slew a second adjusted voltage setpoint $V_2$ to the adjusted voltage setpoint $V_1$. In some of these examples, the voltage regulator 144 may be caused to regulate the output voltage $V_{out}$ based on the second adjusted voltage setpoint $V_2$, and thereby based on the adjusted voltage setpoint $V_1$. Additionally or alternatively, in some examples, the processing circuitry 142 may be further configured to reduce the adjusted voltage setpoint $V_1$ proportional to the load 130 on the external bus line 120, and thereby to a reduced adjusted voltage setpoint $V_{radj}$. In some of these examples, the voltage regulator 144 may be caused to regulate the output voltage $V_{out}$ based on the reduced adjusted voltage setpoint $V_{radj}$, and thereby based on the adjusted voltage setpoint $V_1$. Here, the second adjusted voltage setpoint $V_2$ may be reduced proportional to the load 130 on the external bus line 120, and thereby to the reduced adjusted voltage setpoint $V_{radj}$.

Figure 2:
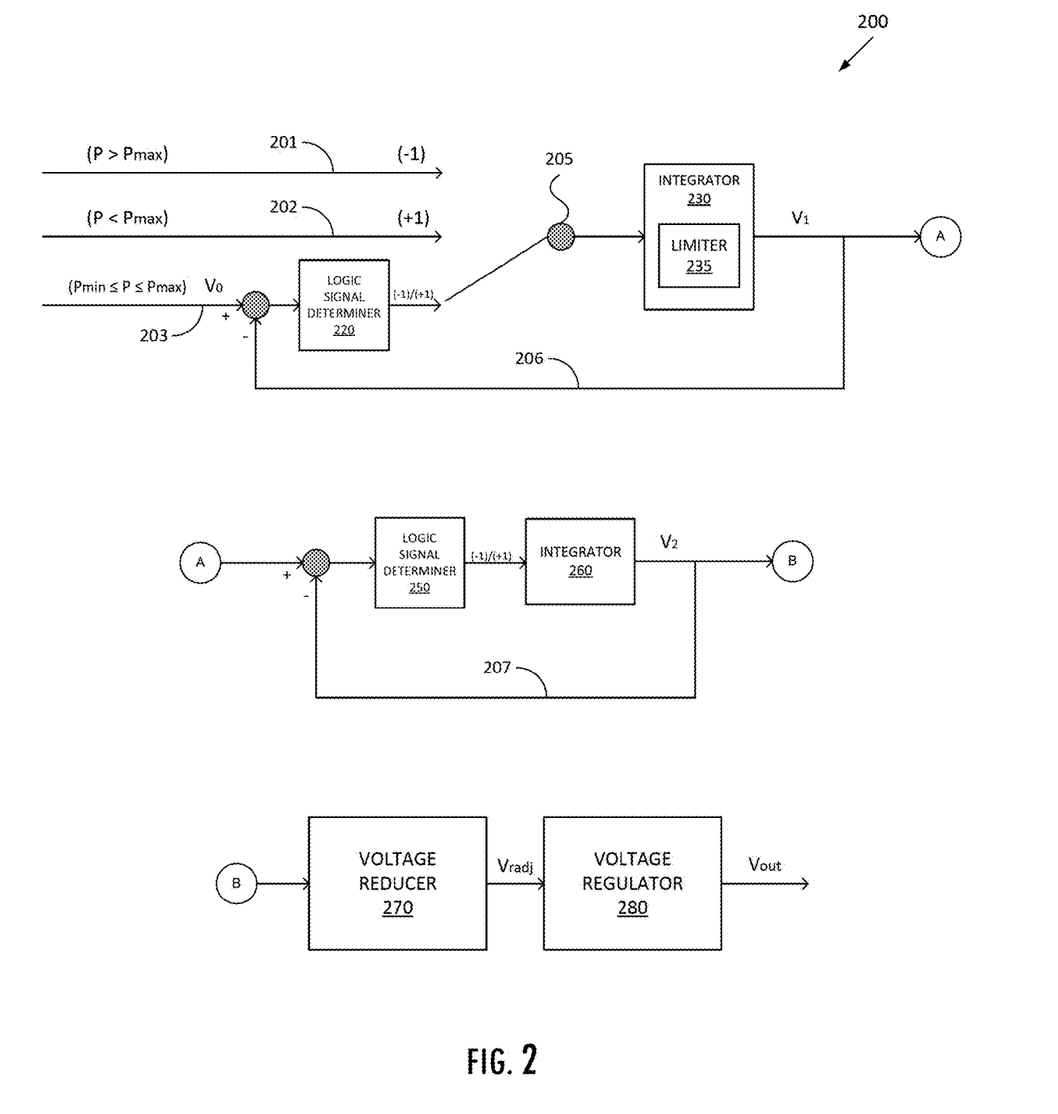
FIG. 2 illustrates a system for power limiting in a power inverter, according to example implementations.

FIG. 2 is a functional block diagram of a system 200 for power limiting in the power inverter 140 shown in FIG. 1, and which may be implemented by the power inverter 140, according to example implementations of the present disclosure. The system 200 includes a number of functional blocks, modules or the like that may be implemented by various means. These means may include hardware such as voltage regulator 144 and/or processing circuitry 146, alone or under direction of one or more computer programs from a computer-readable storage medium, such as computer-readable program code 147 in memory 146.

In some example implementations, a logic signal is produced according to the determined power level P, as shown in FIG. 2. The logic signal may have a high or low value (e.g., +1 or −1). The high value may be used for when P is below $P_{min}$. The low value may be used for when P is above $P_{max}$. The system 200 may receive the logic signal via one of three paths 201-203 depending on the determined power level P. The system 200 may include a switch 205 configured to select one of the paths 201-203 depending on which path is active (inputting a logic signal). The system 200 may also include an integrator 230 connected to the switch 205. The integrator 230 may be utilized to determine the adjusted voltage setpoint $V_1$ according to $$\frac{k_{dVdt}}{s},$$

wherein k is a gain constant and dVdt represents a power setpoint slew rate. The integrator 230 may also include a limiter 235, which may limit the adjusted voltage setpoint $V_1$ to a maximum of $1.2V_0$ or a minimum of $0.2V_0$, in keeping with the previous description based on power level P.

Path 203 may include use of a feedback loop 206 to compare the voltage setpoint $V_0$ with the adjusted voltage setpoint $V_1$. The comparison result may be provided to a logic signal determiner 220 within the system 200. The logic signal determiner 220 may be configured to utilize the comparison result (x) as follows:

$$\text{sign}[x] = \begin{Bmatrix} -1 \text{ if } (x < 0) \\ +1 \text{ if } (x \geq 0) \end{Bmatrix} \quad (3)$$

According to the sign[x] test shown in (3), a logic signal with a low value (−1) is produced when the comparison result indicates $V_0 < V_1$, whereas a logic signal with a high value (+1) is produced when $V_0 \geq V_1$.

In some example implementations, a logic signal having a middle value (e.g., 0) may be used for when it is determined that the adjusted voltage setpoint $V_1$ is equal to the voltage setpoint $V_0$.

The system 200 may also include a second logic signal determiner 250, which may be utilized in some example implementations to produce a second logic signal based on a comparison result from comparing the second adjusted voltage setpoint $V_2$ to the adjusted voltage setpoint $V_1$ via a feedback loop 207. The logic signal determiner 250 may operate substantially similar to the logic signal determiner 220 by utilizing the sign[x] test shown in (3).

The second logic signal may be provided to a second integrator 260 within the system 200. The second integrator may be configured to determine the second adjusted voltage setpoint $V_2$ in a manner substantially similar to the integrator 230.

The second adjusted voltage setpoint $V_2$ may be provided to a voltage reducer 270 within the system 200. The voltage reducer 270 may be configured to implement the standard droop algorithm and may output the reduced adjusted voltage setpoint $V_{radj}$ to voltage regulator 280.

Figure 3:
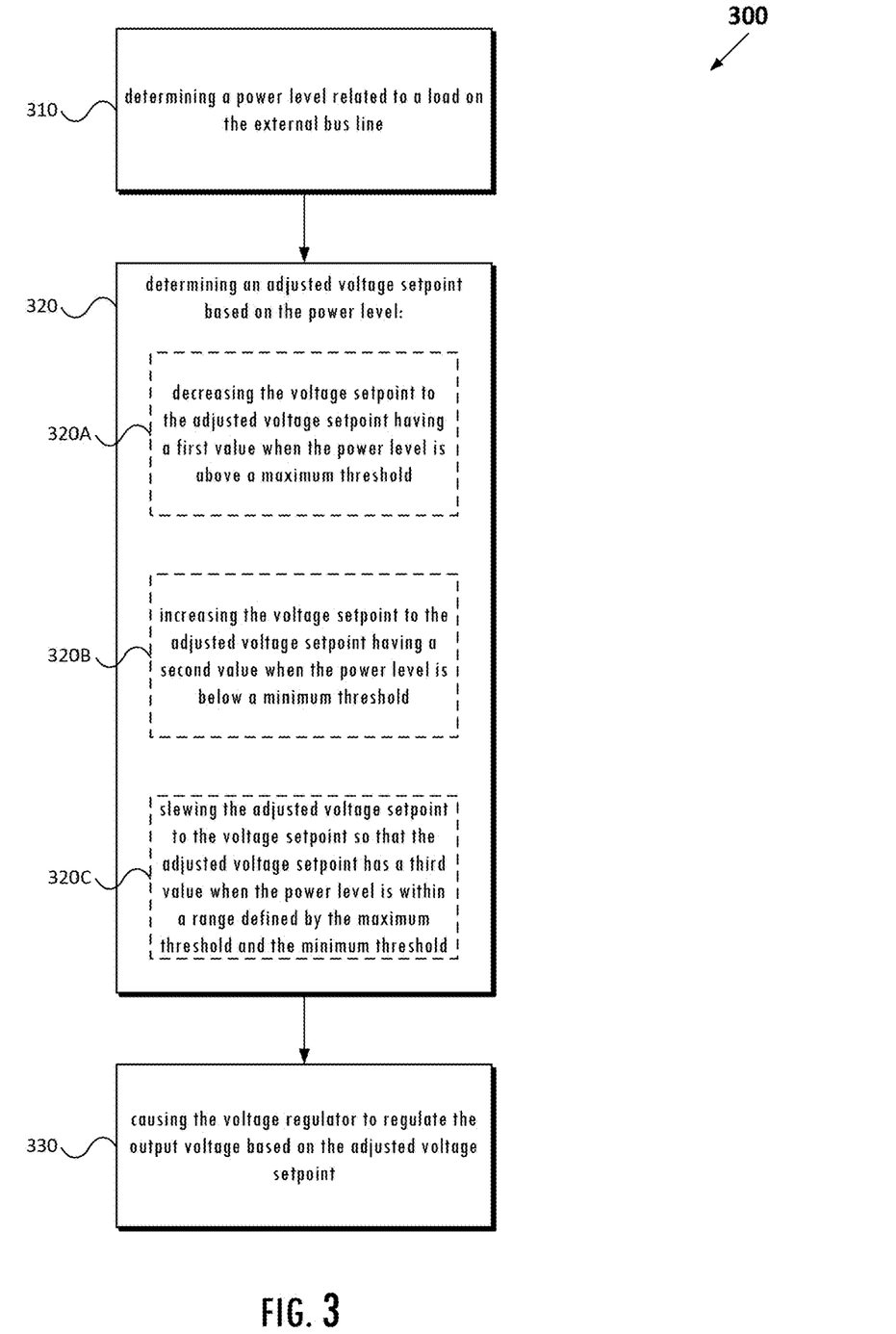
FIG. 3 is a flowchart illustrating various steps in a method for performing power limiting in a power inverter, according to example implementations.

FIG. 3 is a flowchart illustrating various steps in a method 300. For illustrative purposes, method 300 may be discussed with reference to the steps being performed in accordance with the power inverter 140 shown in FIG. 1 and/or the system 200 shown in FIG. 2. Additionally, while FIG. 3 shows an example implementation of method 300, other example implementations of method 300 may contain fewer or more steps. Further, while in some example implementations the steps of method 300 may be performed as shown in FIG. 3, in other example implementations the steps may be performed in a different order, or certain steps may occur simultaneously with one or more other steps. Portions of method 300 may be implemented as a series of modules, which may function in concert with electronic devices. Such modules may be utilized separately and/or together, locally and/or remotely to form a program product thereof.

Method 300 may be used for performing power limiting in the power inverter 140 connected to the external bus line 120, the power inverter 140 configured to produce output voltage $V_{out}$ and having a voltage regulator 144 with a voltage setpoint $V_0$ defined for no load on the external bus line 120, according to example implementations of the present disclosure.

As shown in FIG. 3, step 310 may include determining a power level P related to the load 130 on the external bus line 120. Step 320 may include determining the adjusted voltage setpoint $V_1$ based on the power level P and may also include an additional step(s). Step 320A may be included in step 320 for decreasing the voltage setpoint $V_0$ to the adjusted voltage setpoint $V_1$ having a first value when the power level P is above a maximum threshold $P_{max}$. Step 320B may be included in step 320 for increasing the voltage setpoint $V_0$ to the adjusted voltage setpoint $V_1$ having a second value when the power level P is below a minimum threshold $P_{min}$. Step 320C may be included in step 320 for slewing the adjusted voltage setpoint $V_1$ to the voltage setpoint $V_0$ so that the adjusted voltage setpoint $V_1$ has a third value when the power level P is within a range defined by the maximum threshold and the minimum threshold ($P_{min} \leq P \leq P_{max}$). Step 330 may include causing the voltage regulator 144 to regulate the output voltage $V_{out}$ based on the adjusted voltage setpoint $V_1$.

Figure 5:
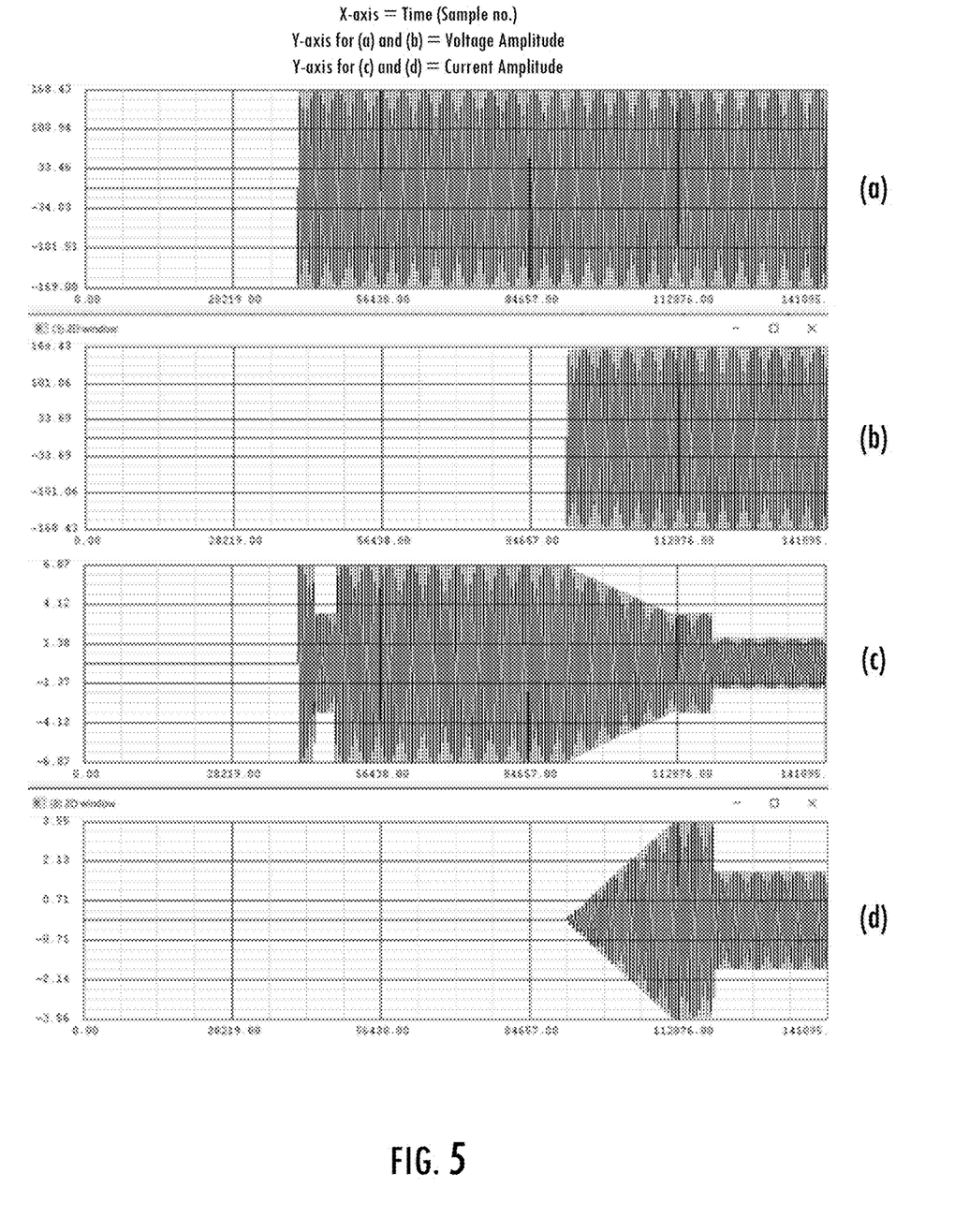
FIG. 5 shows voltage and current waveforms for power inverters in an operating scenario, according to example implementations.

FIG. 5 shows an example of parallel operation of multiple inverters without power limiting. In this example, the first inverter turns on with a manageable resistive load ($R_{load}$), the load does a step change, a second inverter synchronizes, and the load does another step change. All load changes remain within normal inverter capabilities. Parts (a) and (c) of FIG. 5 show the voltage and current waveforms, respectively, of the first inverter; parts (b) and (d) show the voltage and current waveforms, respectively, of the second inverter. Table I describes the sequence of events for the example of FIG. 5.

TABLE I

Power Inverter Synchronization Without Power Limiting

| Time (sample no) | Event | Description |
| --- | --- | --- |
| 0-40587 | Inverter-1 PLL test | Inverter-1 is started and finds a dead bus condition. The inverter turns on with full voltage. |
| 40587-44100 | $R_{load}$ = 48 Ω | Inverter-1 supports the entire load at the droop voltage solution. |
| 44100-47778 | $R_{load}$ = 24 Ω | Inverter-1 supports a different load at the new droop voltage solution. |
| 79000-91728 | Inverter-2 PLL test | Inverter-2 is started and finds a live bus condition. The inverter turns on with matching voltage and zero current (and power) output. |
| 91728-111793 | Inverter-2 slews its voltage up while picking up load. | The voltage ramp ends when the V-P calculation matches the droop algorithm. At this point, both inverters are carrying the same load. |
| 119756 | $R_{load}$ = 48 Ω | A load step occurs, and both inverters respond independently and continue to share the load equally, without the need for external communications. |

Figure 6:
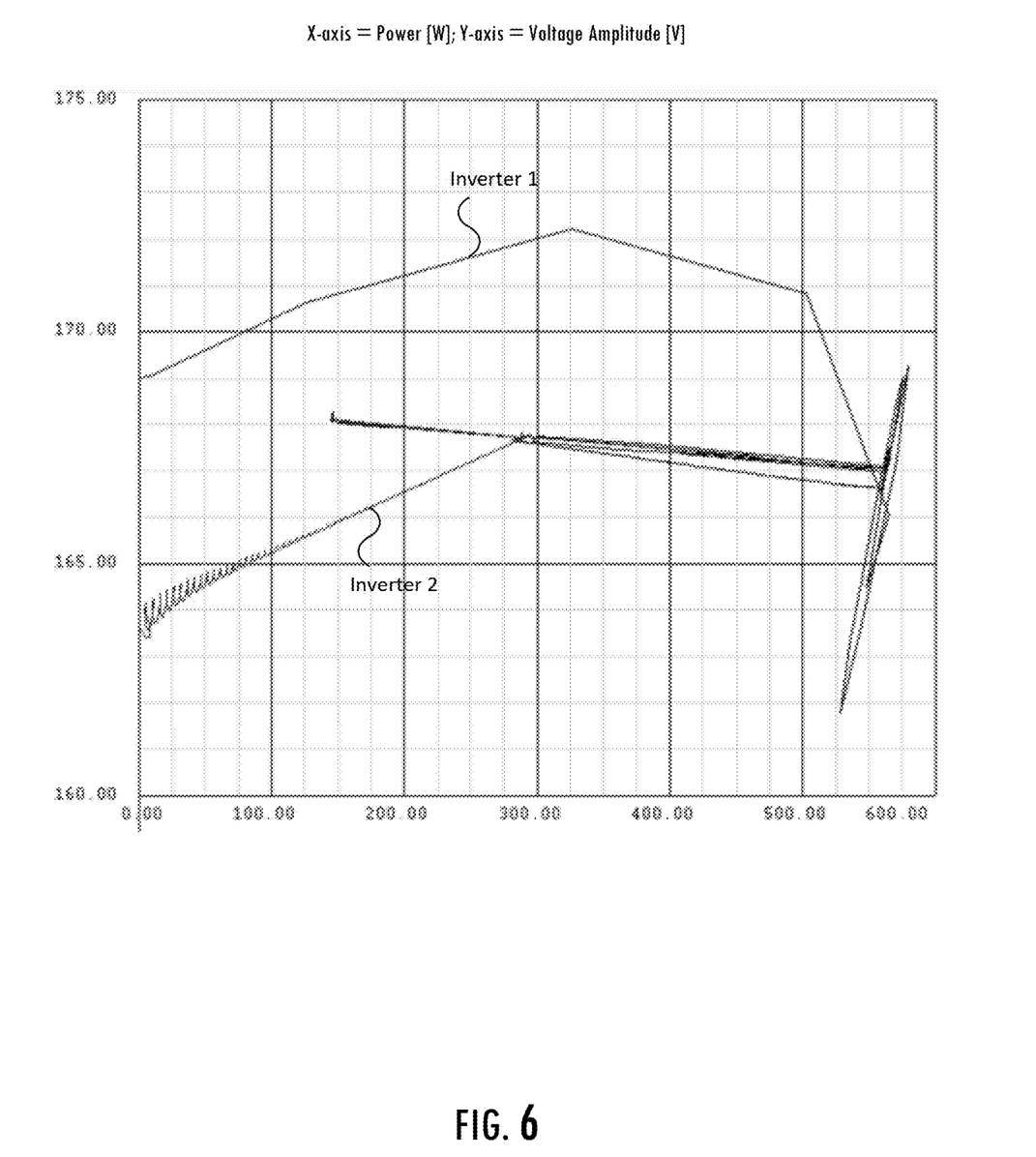
FIG. 6 shows V-P trajectories for the power inverters of FIG. 5 over the given time interval.

FIG. 6 shows the V-P trajectories over the time interval of the example in FIG. 5 and Table I. The operating point slews to the droop curve, and each change in operating condition results in a different droop solution.

Figure 7:
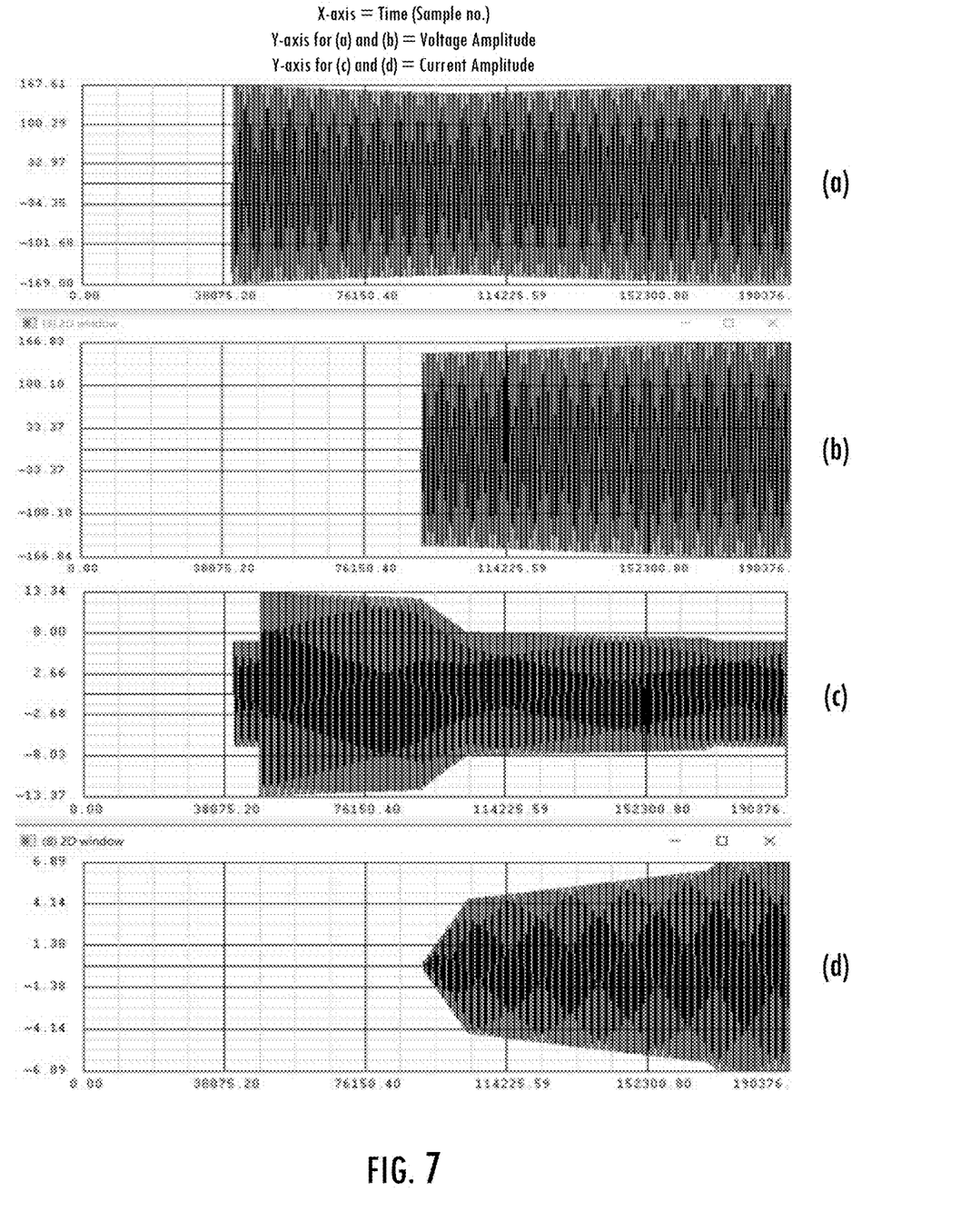
FIG. 7 shows voltage and current waveforms for power inverters in another operating scenario, according to example implementations.

FIG. 7 shows another example of parallel operation of multiple inverters with power limiting. Parts (a) and (c) of FIG. 7 show the voltage and current waveforms, respectively, of the first inverter; parts (b) and (d) show the voltage and current waveforms, respectively, of the second inverter. In this example the first load step for $R_{load}$ (changing from 24Ω to 12Ω) results in overpowering the first inverter, which responds by reducing its voltage (at the slew rate) to stay within its power limit (set at 600 W). In the example, an operator may realize the need for additional source power and turn on a second inverter. The second inverter synchronizes during the slew period of the first inverter, demonstrating that synchronization may be possible even to a ramping voltage of the first inverter. The two inverters jointly and independently discover an operating point where both inverters reduce their voltages to meet their power limits and end up providing a combined 1200 W. The load may eventually be reduced back to a level that can be supported by normal operation, and both inverters may smoothly exit power limiting, all while remaining balanced. Table II describes the sequence of events for the example of FIG. 7.

TABLE II

Power Inverter Synchronization With Power Limiting

| Time (sample no) | Event | Description |
|---|---|---|
| 0-40916 | Inverter-1 PLL test | Inverter-1 is started and finds a dead bus condition. The inverter turns on with full voltage. |
| 40916-48300 | $R_{load} = 24\ \Omega$ | Inverter-1 supports the load at the droop voltage solution. |
| 48300-91370 | $R_{load} = 12\ \Omega$ | Inverter-1 supports a large load requiring power limiting. The operating point is slewing to the new solution. |
| 79000-91370 | Inverter-2 PLL test, $R_{load} = 12\ \Omega$ | Inverter-2 is started and finds a live bus condition. The inverter turns on with matching voltage to the instantaneously slewing voltage output by inverter-1. At the turn-on, inverter-2 has zero current (and power) output. |
| 91370-171140 | $R_{load} = 12\ \Omega$ | Both inverters are independently slewing towards a solution of power balance with limiters engaged. |
| 171140 | $R_{load} = 12\ \Omega$ | Steady state is reached with both inverters sharing the load equally without external communications. |

Figure 8:
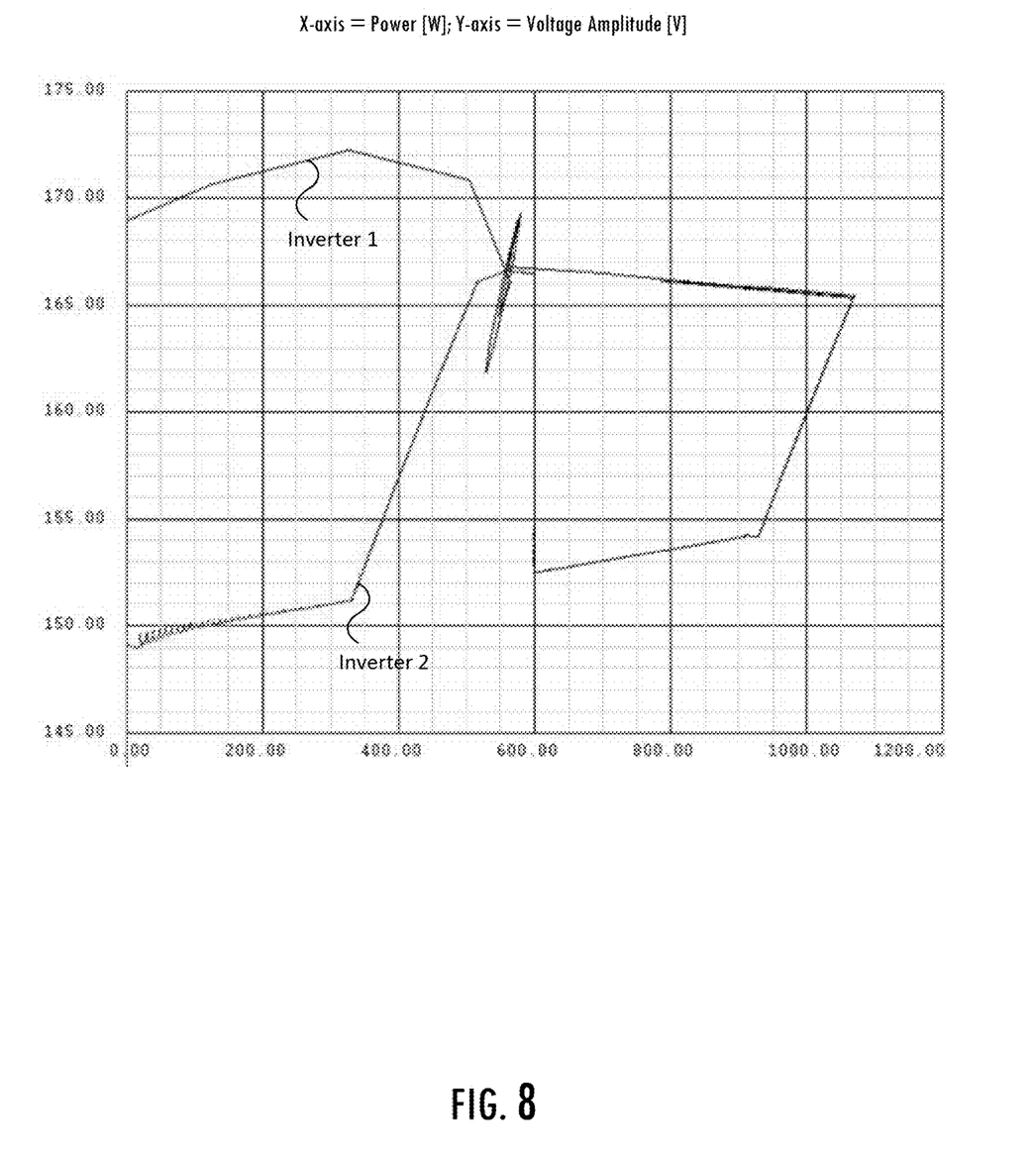
FIG. 8 shows V-P trajectories for the power inverters of FIG. 7 over the given time interval.

FIG. 8 shows the V-P trajectories over the time interval of the example in FIG. 7 and Table II. The operating point slews to the power-limited droop curve, and both inverters find the same solutions without the need for any external communication in both normal and power-limited operation.

Figure 9:
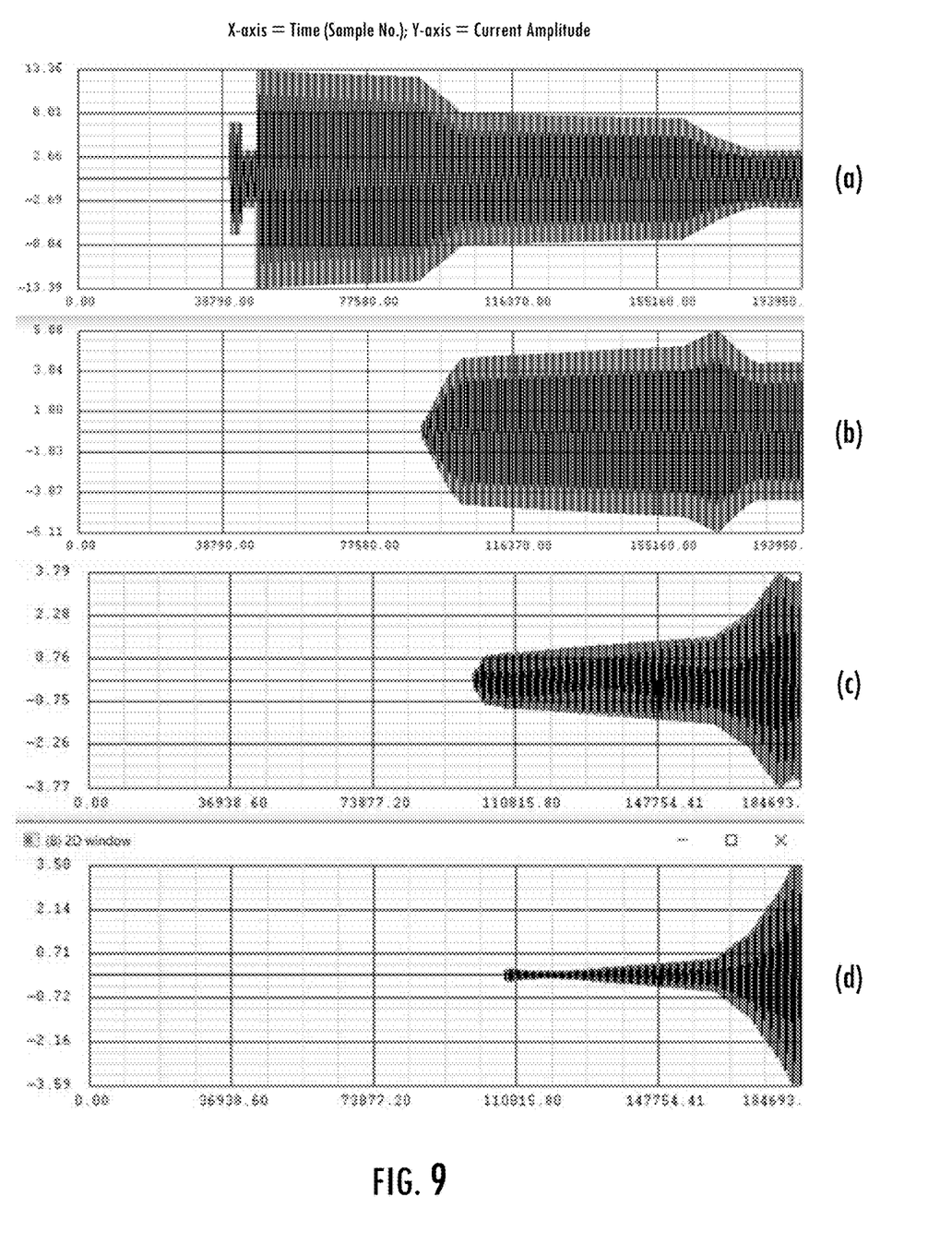
FIG. 9 shows current waveforms for power inverters in yet another operating scenario, according to example implementations.

FIG. 9 shows another example of parallel operation of multiple inverters. This example is substantially similar to the example of FIG. 7, except now three new inverters are synced to the first inverter after the large load is turned on and power limiting has been initiated. The three new inverters were added with random time delays. Together, the synced inverters have enough capability to support the load and may exit power limiting.

Parts (a) through (d) of FIG. 9 show the current waveforms of the four inverters, respectively. As shown, the four inverters smoothly transition through their operating point decisions, all while maintaining synchronization, current and power limiting, and without requiring external communications. Even when a slew-rate limiter profile may result in some temporary power distributions, none of the inverters are excessively stressed.

In keeping with the descriptions of the present disclosure, processing circuitry may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in memory (of the same or another apparatus).

Processing circuitry may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as, or otherwise include, one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

Memory is generally any piece of computer hardware that is capable of storing information such as, for example, data, computer programs (e.g., computer-readable program code) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a solid-state drive (SSD), flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

As indicated above, program code instructions 147 may be stored in memory 146, and executed by processing circuitry 142 that is thereby programmed, to implement functions of the apparatus, method, system(s), subsystem(s), tools and their respective elements described herein. As may be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processing circuitry, or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry, or other programmable apparatus to configure the computer, processing circuitry, or other programmable apparatus to execute operations to be performed on or by the computer, processing circuitry, or other programmable apparatus.

Retrieval, loading, and execution of the program code instructions may be performed sequentially such that one instruction is retrieved, loaded, and executed at a time. In some example implementations, retrieval, loading, and/or execution may be performed in parallel such that multiple instructions are retrieved, loaded, and/or executed together. Execution of the program code instructions may produce a computer-implemented process such that the instructions executed by the computer, processing circuitry, or other programmable apparatus provide operations for implementing functions described herein.

Execution of instructions by processing circuitry, or storage of instructions in a computer-readable storage medium, supports combinations of operations for performing the specified functions. In this manner, a power inverter 140 may include processing circuitry 142 and a computer-readable storage medium or memory 146 coupled to the processing circuitry 142, where the processing circuitry is configured to execute computer-readable program code 147 stored in the memory 146. It may also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure provided herein may come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for power limiting in a power inverter connected to an external bus line, the power inverter configured to produce an output voltage and having a voltage regulator with a voltage setpoint defined for no load on the external bus line, the method comprising:
   determining a power level related to a load on the external bus line;
   determining an adjusted voltage setpoint based on the power level, including:
      decreasing the voltage setpoint to the adjusted voltage setpoint having a first value when the power level is above a maximum threshold;
      increasing the voltage setpoint to the adjusted voltage setpoint having a second value when the power level is below a minimum threshold; and
      slewing the adjusted voltage setpoint to the voltage setpoint so that the adjusted voltage setpoint has a third value when the power level is within a range defined by the maximum threshold and the minimum threshold; and
   causing the voltage regulator to regulate the output voltage based on the adjusted voltage setpoint.

2. The method of claim 1, wherein the first value is no less than 20% of the voltage setpoint.

3. The method of claim 1, wherein the second value is no greater than 120% of the voltage setpoint.

4. The method of claim 1, wherein the third value is no less than 20% of the voltage setpoint and no greater than 120% of the voltage setpoint.

5. The method of claim 1, wherein the power level and thereby the adjusted voltage setpoint are time-variable, and the slewing the adjusted voltage setpoint causes the third value of the adjusted voltage setpoint to approach the voltage setpoint over time.

6. The method of claim 1, further comprising:
   slewing a second adjusted voltage setpoint to the adjusted voltage setpoint,
   wherein the voltage regulator is caused to regulate the output voltage based on the second adjusted voltage setpoint, and thereby based on the adjusted voltage setpoint.

7. The method of claim 1, further comprising:
   reducing the adjusted voltage setpoint proportional to the load on the external bus line, and thereby to a reduced adjusted voltage setpoint,
   wherein the voltage regulator is caused to regulate the output voltage based on the reduced adjusted voltage setpoint, and thereby based on the adjusted voltage setpoint.

8. The method of claim 7, further comprising:
   slewing a second adjusted voltage setpoint to the adjusted voltage setpoint,
   wherein the second adjusted voltage setpoint is reduced proportional to the load on the external bus line, and thereby to the reduced adjusted voltage setpoint.

9. A power inverter connectable to an external bus line and configured to produce an output voltage, the power inverter comprising:
   a voltage regulator with a voltage setpoint defined for no load on the external bus line; and
   processing circuitry configured to:
      determine a power level related to a load on the external bus line;
      determine an adjusted voltage setpoint based on the power level, including the processing circuitry configured to:
         decrease the voltage setpoint to the adjusted voltage setpoint having a first value when the power level is above a maximum threshold;
         increase the voltage setpoint to the adjusted voltage setpoint having a second value when the power level is below a minimum threshold; and
         slew the adjusted voltage setpoint to the voltage setpoint so that the adjusted voltage setpoint has a third value when the power level is within a range defined by the maximum threshold and the minimum threshold; and
      cause the voltage regulator to regulate the output voltage based on the adjusted voltage setpoint.

10. The power inverter of claim 9, wherein the first value is no less than 20% of the voltage setpoint.

11. The power inverter of claim 9, wherein the second value is no greater than 120% of the voltage setpoint.

12. The power inverter of claim 9, wherein the third value is no less than 20% of the voltage setpoint and no greater than 120% of the voltage setpoint.

13. The power inverter of claim 9, wherein the power level and thereby the adjusted voltage setpoint are time-variable, and the slewing the adjusted voltage setpoint causes the third value of the adjusted voltage setpoint to approach the voltage setpoint over time.

14. The power inverter of claim 9, wherein the processing circuitry is further configured to:
   slew a second adjusted voltage setpoint to the adjusted voltage setpoint,
   wherein the voltage regulator is caused to regulate the output voltage based on the second adjusted voltage setpoint, and thereby based on the adjusted voltage setpoint.

15. The power inverter of claim 9, wherein the processing circuitry is further configured to:
   reduce the adjusted voltage setpoint proportional to the load on the external bus line, and thereby to a reduced adjusted voltage setpoint,
   wherein the voltage regulator is caused to regulate the output voltage based on the reduced adjusted voltage setpoint, and thereby based on the adjusted voltage setpoint.

16. The power inverter of claim 15, wherein the processing circuitry is further configured to:
   slew a second adjusted voltage setpoint to the adjusted voltage setpoint,
   wherein the second adjusted voltage setpoint is reduced proportional to the load on the external bus line, and thereby to the reduced adjusted voltage setpoint.

17. A computer-readable storage medium for power limiting in a power inverter connectable to an external bus line, the power inverter configured to produce an output voltage and having a voltage regulator with a voltage setpoint defined for no load on the external bus line, the computer-readable storage medium being non-transitory and having computer-readable program code stored therein that in response to execution by processing circuitry, cause the power inverter to at least:
   determine a power level related to a load on the external bus line;
   determine an adjusted voltage setpoint based on the power level, including the power inverter caused to:
      decrease the voltage setpoint to the adjusted voltage setpoint having a first value when the power level is above a maximum threshold;
      increase the voltage setpoint to the adjusted voltage setpoint having a second value when the power level is below a minimum threshold; and
      slew the adjusted voltage setpoint to the voltage setpoint so that the adjusted voltage setpoint has a third value when the power level is within a range defined by the maximum threshold and the minimum threshold; and
   cause the voltage regulator to regulate the output voltage based on the adjusted voltage setpoint.

18. The computer-readable storage medium of claim 17, wherein the first value is no less than 20% of the voltage setpoint, wherein the second value is no greater than 120% of the voltage setpoint, and wherein the third value is no less than 20% of the voltage setpoint and no greater than 120% of the voltage setpoint.

19. The computer-readable storage medium of claim 17, wherein the power level and thereby the adjusted voltage setpoint are time-variable, and the slewing the adjusted voltage setpoint causes the third value of the adjusted voltage setpoint to approach the voltage setpoint over time.

20. The computer-readable storage medium of claim 17 having further computer-readable program code stored therein that in response to execution by the processing circuitry, causes the power inverter to:
   slew a second adjusted voltage setpoint to the adjusted voltage setpoint,
   wherein the voltage regulator is caused to regulate the output voltage based on the second adjusted voltage setpoint, and thereby based on the adjusted voltage setpoint.

* * * * *